REFRIGERATORS

Original Filed June 1, 1966 2 Sheets-Sheet 1

INVENTORS

FRANCIS L. RIVARD
EARL K. HARLEY

BY
Strauch, Nolan, Neale, Nies & Bronaugh
ATTORNEYS

REFRIGERATORS

Original Filed June 1, 1966 2 Sheets-Sheet 2

INVENTORS

FRANCIS L. RIVARD
EARL K HARLEY

BY
Strauch, Nolan, Neale, Nies & Bronaugh
ATTORNEYS

United States Patent Office

Re. 27,990

Reissued Apr. 23, 1974

27,990

REFRIGERATORS

Francis L. Rivard and Earl K. Harley, Greenville, Mich., assignors to White Consolidated Industries, Inc., Lakewood, Ohio Original No. 3,370,439, dated Feb. 27, 1968, Ser. No. 554,435, June 1, 1966. Application for reissue Aug. 23, 1968, Ser. No. 763,432

Int. Cl. F25d *17/04*

U.S. Cl. 62—419 11 Claims

Matter enclosed in heavy brackets [ ] appears in the original patent but forms no part of this reissue specification; matter printed in italics indicates the additions made by reissue.

ABSTRACT OF THE DISCLOSURE

Refrigerators in which fresh food and frozen food compartments are arranged in side-by-side configuration and in which air is caused to flow over an evaporator through an air passage and duct system to maintain the two compartments at the desired temperatures without the formation of visible frost.

This invention relates to refrigeration apparatus and more particularly to refrigerators having separate freezer and fresh food compartments arranged in side-by-side relation.

Because of their convenience, multi-compartment refrigerators have come into widespread use in recent years. Most such refrigerators comprise freezer compartments and fresh food compartments arranged one above the other, each compartment extending the full width of the refrigerator. It has also been proposed to provide refrigerators in which the two compartments are disposed in side-by-side relation, each compartment extending the full height of the refrigerator.

The obvious advantages of such multi-compartment refrigerators have been off-set in the past, to some extent, by their relatively high cost and relatively low efficiency. Further, the highly competitive nature of the refrigerator market requires that a single refrigeration system be utilized for cooling both compartments. Prior units which employ a double system or a split system are prohibitively expensive. Attempts to utilize in a two compartment refrigerator only the components which are normally used in a single compartment unit have, for the most part, met only with limited success particularly in units in which the compartments are arranged side-by-side.

Because of the height of each of the compartments particular care must be taken to prevent wide temperature variations in each of the compartments. Also, it is essential that balanced cooling be obtained, i.e., the refrigeration system must effectively maintain the entire freezer compartment at a temperature below 32° while the fresh food compartment is maintained at an appropriate uniform temperature above 32°.

With these considerations in mind, it is a principal purpose and object of the present invention to provide improved two compartment refrigerators in which the compartments are arranged side-by-side, the refrigerators having a unique air flow system which effectively maintains the desired conditions of temperature and humidity in each of the compartments under a wide range of operating conditions.

It is a further object of the invention to provide a two compartment refrigerator of the type in which the compartment are arranged side-by-side in which both compartments are effectively cooled by a single refrigeration system including one evaporator coil and one fan.

It is an additional object to provide improved refrigerators of the type described in which the formation of visible frost is eliminated.

It is also an object of the present invention to provide improved two compartment refrigerators of the type described in which all of the components of the refrigeration system are housed in one wall of one compartment preferably the rear wall of the frozen food compartment.

It is a further object of the present invention to provide improved multi-compartment refrigerators which are of simplified construction and which thus may be produced at relatively low cost and offer increased reliability and freedom from maintenance.

These and other objects are attained in accordance with the present invention by the provision of refrigerators divided by an insulated vertical wall into frozen food and fresh food compartments. The refrigerator system comprises a compressor, a single evaporator coil, a single fan, and air duct structure all positioned behind a false wall at the rear of the frozen food compartment. The fan draws air over the evaporator coil, the air delivered by the fan being divided, a portion flowing into the upper region of the frozen food compartment and the remainder being conducted through the divider wall for delivery to the upper region of the fresh food compartment. The air is returned from the frozen food compartment to the evaporator coil preferably positioned at the bottom of the frozen food compartment. Air is returned to the evaporator coil from the fresh food compartment through duct stucture extending through the divider wall adjacent the lower region of the two compartments. The invention also provides controls for achieving balanced cooling of the two compartments under widely varying conditions of temperature and load.

Additional objects and advantages of the present invention will become apparent as the description proceeds in connection with the accompanying drawings in which.

Figure 1:
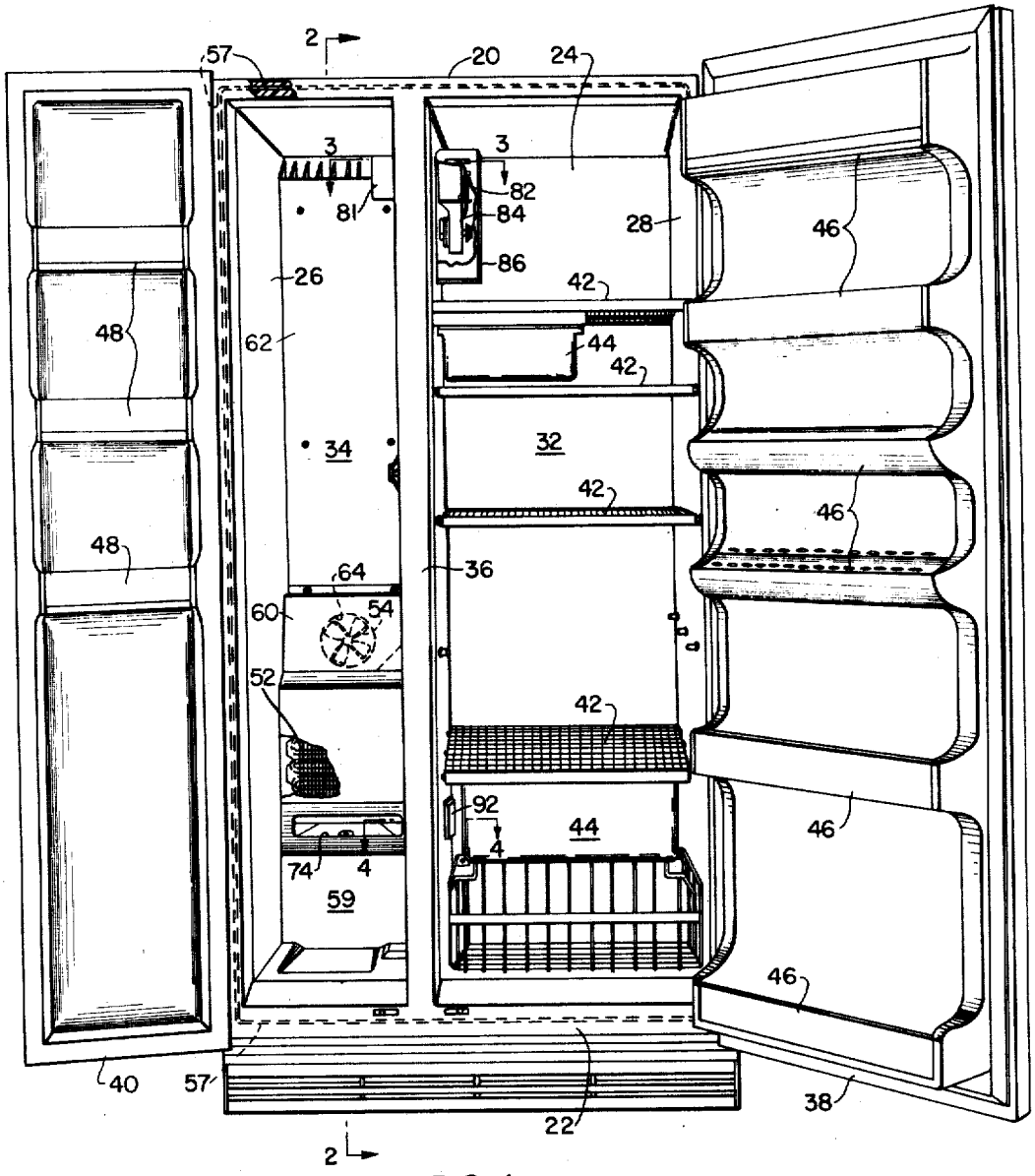
FIGURE 1 is a front view in perspective of a refrigerator incorporating the present invention.
Figure 3:
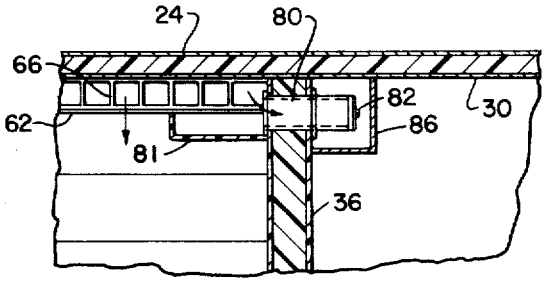
Figure 4:
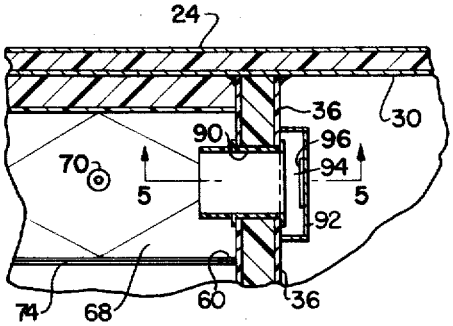
Figure 5:
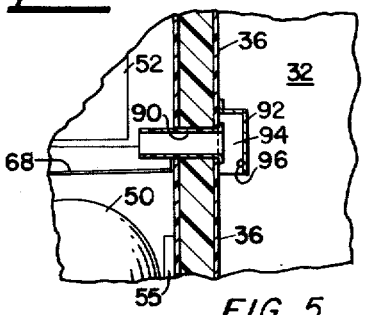

FIGURES 3 and 4 are fragmentary sections taken along lines 3—3 and 4—4 of FIGURE 1, respectively, illustrating details of the duct structure; and FIGURE 5 is a vertical section taken along line 5—5 of FIGURE 4.

Referring now more particularly to the drawings, the refrigerator of the present invention comprises an insulated cabinet of vertically elongated form having top and bottom walls 20 and 22, a rear wall 24 and side walls 26 and 28. Preferably, the top, bottom, side and rear walls are covered by a one-pieced liner 30. The interior of the refrigerator cabinet is divided into a fresh food compartment 32 and a frozen food compartment 34 by a vertical insulated divider wall 36 which extends from top to bottom and front to rear of the cabinet. The wall is secured in place by any suitable means, not shown.

Since the requirements for storage space for frozen food are usually less than the requirements for fresh food, the wall 36 is offset from the vertical center line of the cabinet so that approximately 60% of the interior space is available for the storage of fresh food and 40% is available for the storage of frozen food. It will be understood that this relationship can be varied to suit the varying requirements of different users. The compartment 32 is closed by the insulated door assembly 38 and the compartment 34 is closed by a separate door assembly 40, each of the doors extending from top to bottom of the refrigerator. In accordance with conventional practice the storage of food is facilitated by the provision of the usual racks 42 and containers 44 and by the usual shelves 46 and 48 provided in the doors 38 and 40, respectively. The shelves and containers have been omitted from the frozen food compartment 34 for clarity. The cabinet structure thus far described is essentially conventional.

Figure 2:
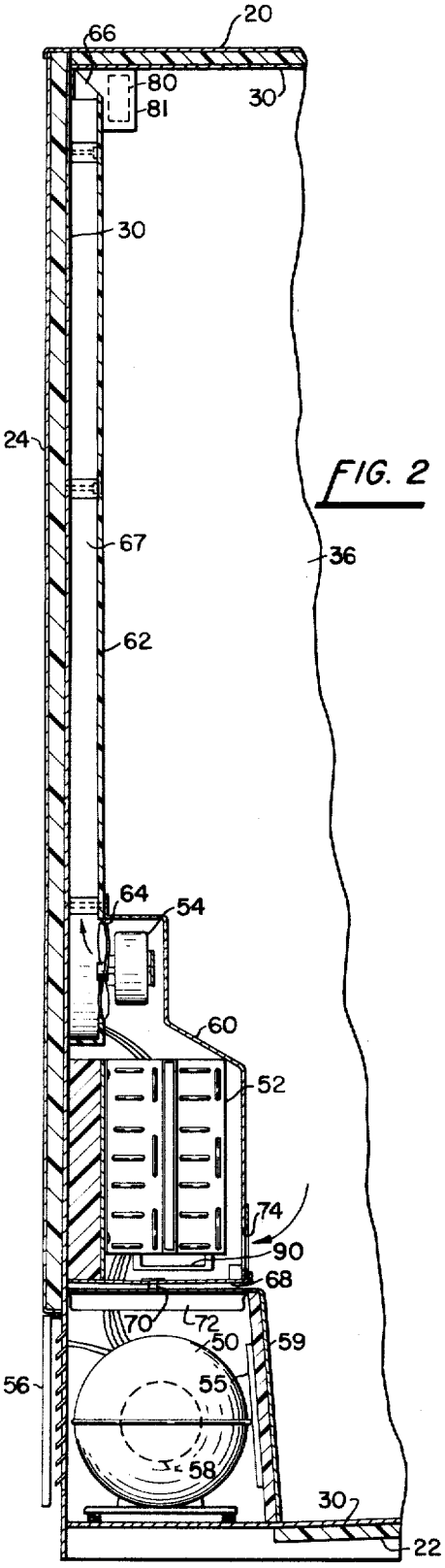
FIGURE 2 is an enlarged fragmentary section taken along line 2—2 of FIGURE 1.

All of the components which produce the flow of cooling air through both compartments of the refrigerator are located at the rear of the frozen food compartment 34 as best shown in FIGURE 2 to which detailed reference will now be made. The principal components of the refrigeration system are the compressor 50, evaporator coil 52, the interior fan 54 and the condenser which comprises a small sheet and tube plate 55, a larger sheet and tube plate 56 and a tube 57 extending around the front of the cabinet. A fan 58 forces air over the condenser sections 55 and 56. As is usual in the art the compressor 50 delivers refrigerant to series connected condenser sections 55, 56 and 57, the refrigerant then passing through an expansion valve or capillary tube, then to the evaporator 52 and returns to the inlet side of the compressor. As best shown in FIGURE 2 the compressor 50 is spring mounted on the floor of the freezer compartment behind an insulated false wall 59. The side and rear walls of the compressor compartment are louvered to permit the flow of air over the coils 55 and 56.

Evaporator coil 52 is positioned directly above the compressor behind a relatively thin sheet metal or plastic wall 60, the upper edge of which is suitably secured to a vertically extending thin plastic or sheet metal wall 62. The walls 59, 60 and 62 extend completely across the rear of the freezer compartment 34 and in the aggregate extend essentially from the bottom to the top of this compartment. At its lower end the wall 62 extends downwardly into the space enclosed by the wall 60 and is provided in this region with an opening 64 for the reception of the fan 54. At its upper end the wall 62 is spaced slightly from the top wall 20 of the freezer compartment and in this area is provided with a number of thin spacers 66 which prevent the entry of food or other objects into the channel 67 formed between the wall 62 and the back wall of the compartment and yet do not significantly obstruct the flow of air outwardly of the top of this channel.

The lower end of the channel 67 is closed by an essentially horizontal plate 68, the center of which is depressed slightly to form a collector for moisture removed from the evaporator coil. At its center the panel 68 is provided with a small drain pipe 70 positioned above a drip pan 72. The otherwise closed lower end of the air channel 67 is provided with a horizontal elongated opening 74 positioned opposite the lower end of the evaporator coil. As described in detail below, operation of the fan 54 draws air inwardly through the opening 74 over the evaporator coil upwardly through the channel 67 for delivery to the upper end of the freezer compartment 34 through the openings provided between the spacers 66.

A portion of the air flowing upwardly through the channel 67 is circulated through the fresh food compartment by the structure best shown in FIGURES 3, 4 and 5. More specifically, air is delivered to the fresh food compartment through a duct assembly 80 in the form of a rectangular plastic tube extending through an opening cut in the insulated divider wall 36 closely adjacent the top of the refrigerator. Air is diverted from the upper end of the channel 67 into the duct 80 by a cover member 81 suitably secured to the forward face of the wall 62. The cover 81 is closed at its bottom end and extends upwardly against the top wall of the frozen food compartment. At its exit end the duct is provided with a flap valve assembly 82, the position of which is under the control of a temperature sensitive unit 84 of conventional construction. Preferably the unit 84 is adjustable to permit variation of the position of the flap valve 82 at a given temperature. For decorative purposes and to protect the valve 82 and the control assembly 84, these components are enclosed in a louvered plastic cover 86 which is open at its bottom end and is provided with a sufficient number of openings to permit the free flow of air out of the duct assembly into the fresh food compartment. The passage for returning the air from the fresh food compartment to the evaporator is provided by a plastic liner 90 extending through an opening cut in the divider wall adjacent the rear lower portion of the latter. The duct thus extends into the frozen food compartment in the region opposite the opening 74 just below the lower edge of the evaporator 52. Preferably the duct is extended somewhat into the freezer frozen food compartment so that the warm air returning from the fresh food compartment is surrounded by a flow of cold air returning from the frozen food compartment to assure proper mixture of these two flows before they reach the evaporator coil.

The refrigerator thus far described is equipped with conventional controls which have been omitted for clarity. The fans 58, 64 and the compressor 50 are cycled on and off together under the control of a temperature sensitive element located in the duct 67. The controls also include a timer which initiates a defrost cycle periodically. In a typical case the defrost cycle will be initiated every six hours and will last approximately sixteen minutes. The condenser coil section 55 assists in the vaporization of the resulting water collected in the pan 72. The freezer compartment also has a door actuated switch which de-energizes the fan 64 when the door 40 is open. When the fresh food section is warm enough to require cooling, the control assembly 84 opens the valve 82 to permit the circulation of up to about 15% of the total air flow through the fresh food compartment If cooling is not required in the fresh food compartment the valve 82 will be closed and all of the air will circulate through the frozen food compartment until the requirements for cooling that compartment have been satisfied.

When the unit is in operation the air delivered by the fan 64 flows upwardly through the channel 67, across the top wall of the frozen food compartment and then downwardly along the front door 40 toward the bottom of the unit for return to the evaporator coil through the opening 74. This air flow is particularly advantageous since the coldest air is delivered to the portion of the freezer compartment which is most likely to reach a temperature in excess of 32°. This air flow pattern guarantees the displacement of the relatively warmer air which tends to accumulate at the upper front portion of the freezer compartment, eliminates stratification of the air and assures thorough and uniform cooling of the contents of the frozen food compartment. A similar flow pattern with similar results occurs in the fresh food compartment whenever the valve 82 is open. When the requirements for cooling have been satisfied the compressor and the fans 58 and 64 are stopped. At this time the valve 82 will be closed or substantially closed thus inhibiting the flow of air between the frozen food and fresh food compartments.

As as air in the fresh food compartment becomes warmer the valve 82 opens and under these conditions there may be some tendency for the cold air from the frozen food compartment to drain into the fresh food compartment. This flow of air is eliminated by a unique "thermal valve" associated with the lower duct 90. This "valve" comprises a cover 92 extending around the inlet of the duct 90 to form a control passage 94 open only at its lower end. A small resistance heater 96 mounted on the lower end of the control passage 94 heats the air locally sufficiently to set up a rising current of air which acts in opposition to the flow of cold air draining from the frozen food compartment, thus effectively maintaining the desired temperature differential between the frozen food compartment and the fresh food compartment during the off-cycle of the compressor and fan. Preferably the control system is so arranged that the heater 96 is operated only during the off-cycle.

The cover 92 performs the additional function of guarding against blockage of the duct 90 by articles of food stored in the fresh food compartment.

From the foregoing it will be apparent that the above stated objects and advantages of the present invention have been obtained by the provision of simple, dependable low-cost apparatus for achieving balanced and uniform cooling in a multi-compartment refrigerator in which the high temperature and low temperature compartments are located in a side-by-side relation. The mechanical components of the system are located at the rear of the relatively narrow freezer compartment and thus occupy a minimum amount of space in a region which is least desirable for the storage of food.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A refrigerator comprising an insulated cabinet, an insulated vertical divider wall extending from top to bottom of said cabinet to provide separate vertical side-by-side fresh food and frozen food compartments, means, *within said frozen food compartment* forming an air channel extending vertically along a wall of said frozen food compartment, said channel having a bottom inlet [opening] adjacent the lower end of said frozen food compartment and a top outlet opening [adjacent] *directly into* the upper end of said frozen food compartment, an evaporator coil within said [insulated cabinet] *frozen food compartment* and positioned in said channel, a fan for forcing air through said channel over said evaporator coil from said inlet [opening to] *through* said outlet [opening,] *passage* means for delivering a portion of the air moved by said fan to the upper portion of said fresh food compartment, and passage means for returning air from the lower portion of said fresh food compartment to said channel at a point closely adjacent to said evaporator.

2. The refrigerator according to claim 1 wherein the means for delivering air to the fresh food compartment comprises a passage extending through said divider wall, and a deflector for delivering a portion of the air flowing through said channel into said passage.

3. The refrigerator according to claim 2 together with a valve for controlling the flow of air into said fresh food compartment, and means responsive to the temperature of said fresh food compartment for positioning said valve.

4. The refrigerator according to claim 1 wherein said evaporator coil is positioned adjacent the bottom end of said channel and the passage means for returning air from the fresh food compartment enters said channel adjacent the lower end of said evaporator coil.

5. A refrigerator comprising an insulated cabinet, an insulated vertical divider wall extending from top to bottom of said cabinet to provide separate vertical side-by-side fresh food and frozen food compartments, means forming an air channel extending vertically along a wall of said frozen food cmpartment, said channel having a bottom inlet opening adjacent the lower end of said frozen food compartment and a top outlet opening adjacent the upper end of said frozen food compartment, an evaporator coil positioned adjacent the bottom end of said channel, a fan for forcing air through said channel over said evaporator coil from said inlet opening to said outlet opening, means for delivering a portion of the air moved by said fan to the upper portion of said fresh food compartment, passage means for returning air from the fresh food compartment, passage means for returning air from the fresh food compartment, said passage means entering said channel adjacent the lower end of said evaporator coil, and means associated with said passage means for preventing the flow of air from said frozen food compartment into said fresh food compartment.

6. A refrigerator comprising an insulated cabinet, an insulated divider wall separating the cabinet into separate frozen food and fresh food compartments, an evaporator compartment in said insulated cabinet, an evaporator coil in said evaporator compartment, a fan for producing a flow of air over said evaporator coil and into each of said compartments, a return air opening in said freezer compartment communicating with said evaporator compartment, a return air opening in said fresh food compartment communicating with said evaporator compartment, and means associated with said fresh food compartment return air opening for preventing the flow of air from said frozen food compartment into said fresh food compartment when said fan is not in operation.

7. The refrigerator according to claim 6 wherein said last mentioned means comprises a heater adjacent said return air opening for heating the air locally sufficiently to set up a rising current of air which acts in opposition to the flow of cold air draining from the frozen food compartment.

8. The refrigerator according to claim 1 wherein said last mentioned passage means comprises a duct extending through said divider into said channel adjacent said bottom inlet [opening], said duct projecting into said channel whereby the warm air returning from said fresh food compartment is surrounded by a flow of cold air returning from said frozen food compartment to assure proper mixture of these two flows before they reach the evaporator coil.

*9. Two temperature refrigerating means including portions defining a low temperature compartment and a higher temperature compartment and means including an upright partitioning wall substantially isolating the compartments from one another, a cooler in the low temperature compartment, air circulating means including a baffle and a fan for forcing circulation of air over said cooler and into said compartments, said circulating means having an inlet communicating with said low temperature compartment and having two outlets from an upper portion thereof, one outlet opening into an upper portion of the low temperature compartment and the other outlet opening into an upper portion of the higher temperature compartment, and a return duct extending through said partioning wall at a position below said outlets for returning air from the higher temperature compartment to the low temperature compartment.*

*10. Two temperature refrigerating means as defined in claim 9 wherein the fan is located in a portion of the low temperature compartment and causes air to flow laterally through said partitioning wall into the upper portion of the higher temperature compartment.*

*11. A refrigerator comprising an insulated cabinet, an insulated vertical divider wall extending from top to bottom of said cabinet to provide separate vertical side-by-side fresh food and frozen food compartments, means within said frozen food compartment forming an air channel extending vertically along a wall of said frozen food compartment, said channel having a bottom inlet adjacent the lower end of said frozen food compartment and a top outlet opening directly into the upper end of said frozen food compartment, an evaporator coil within said frozen food compartment and positioned in said channel, a fan for forcing air through said channel over said evaporator coil from said inlet through said outlet, passage means for delivering a portion of the air moved by said fan to the upper portion of said fresh food compartment, and passage means for returning air from said fresh food com-*

*partment to said channel at a point closely adjacent to said evaporator.*

References Cited

The following references, cited by the Examiner, are of record in the patented file of this patent or the original patent.

UNITED STATES PATENTS

| | | | |
|---|---|---|---|
| 2,467,427 | 4/1949 | Green | 62—187 |
| 2,812,642 | 11/1957 | Jacobs | 62—186 |

| | | | |
|---|---|---|---|
| 2,815,649 | 12/1957 | Angelus | 62—419 X |
| 3,122,005 | 2/1964 | Constantini | 62—419 |
| 3,137,146 | 6/1964 | Wattenbrock | 62—419 |
| 2,462,279 | 2/1949 | Passman | 62—419 |

WILLIAM J. WYE, Primary Examiner

U.S. Cl. X.R.

612—186, 187, 408, 441

UNITED STATES PATENT OFFICE

CERTIFICATE OF CORRECTION

Patent No. Re. 27,990 Dated April 23,1974

Inventor(s) Francis L. Rivard et al

It is certified that error appears in the above-identified patent and that said Letters Patent are hereby corrected as shown below:

Column 4, line 57, change "as" (second occurrence) to --the--.
Column 5, line 39, insert --,-- after "outlet".
Column 5, line 66, change "cmpartment" to --compartment--.
Column 6, line 1, delete "passage means for returning air from the fresh food compartment,"

Signed and sealed this 1st day of October 1974.

(SEAL)
Attest:

McCOY M. GIBSON JR.
Attesting Officer

C. MARSHALL DANN
Commissioner of Patents